Patented Aug. 11, 1931

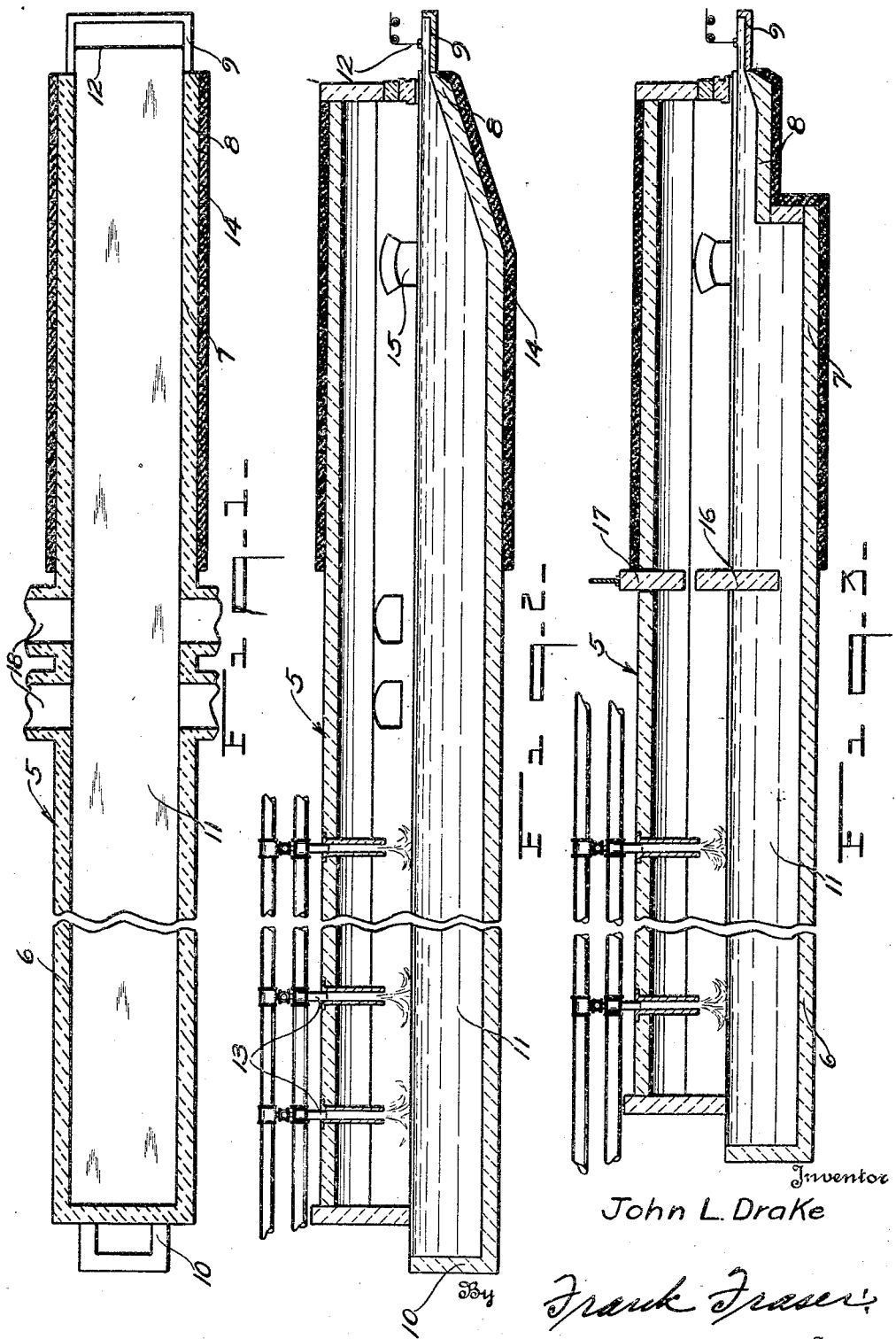

1,818,202

UNITED STATES PATENT OFFICE

JOHN L. DRAKE, OF TOLEDO, OHIO, ASSIGNOR TO LIBBEY-OWENS-FORD GLASS COMPANY, OF TOLEDO, OHIO, A CORPORATION OF OHIO

APPARATUS FOR PRODUCING SHEET GLASS

Application filed June 3, 1927. Serial No. 196,215.

The present invention relates to an improved apparatus for producing sheet glass.

While the furnace hereinafter described and illustrated in the accompanying drawings is primarily designed for use with sheet glass drawing apparatus of the type set forth in the patent to Colburn 1,248,809 granted Dec. 4, 1917, it will be equally useful with other types of sheet drawing machines where the sheet is drawn vertically from a pool of molten glass or in fact with any type of glass working apparatus.

The furnaces now in general use with the type of machine mentioned above comprise tanks of a generally rectangular shape which contain a large reservoir of molten glass. This molten glass flows from the melting chamber at one end of the furnace through a refining chamber and thence through a cooling chamber to a working receptacle or draw-pot from which the sheet is drawn upwardly. These melting, refining and cooling chambers together with the draw-pot are not of the same size but instead are usually of substantially different widths and sometimes reduced necks are resorted to so that a considerable portion of the molten glass will lie practically undisturbed or stationary in the "dead" corners of the tank. This glass, as it gradually changes in temperature and composition becomes devitrified and forms so-called "dog-metal."

Also, the molten glass in the furnace is not ordinarily uniform in temperature throughout the entire width thereof but instead, the border portions are relatively cooler than the central flow of glass, this being caused by the radiation of heat through the side walls of the furnace. Due to this difference in temperature, the flow movement of the central stream of molten glass through the tank is more rapid than that of the border portions, with the result that the glass when introduced into the sheet does not have a uniform flow movement throughout its entire width. The variations in the composition of the molten glass together with the resulting differences in the tractive response of the glass as it is drawn along and into the sheet, causes difficulty in forming a good sheet of glass, sometimes causing inequalities and blemishes therein. The hot faster moving central stream of molten glass will also have a tendency to drag along a portion of the cooler glass and particles of the dog-metal formed in the dead corners of the tank.

The aim of the present invention is to provide a continuous tank furnace of improved construction which is practically devoid of all dead spaces or corners and wherein the molten glass will have a substantially uniform flow movement and temperature throughout its entire width. Practically none of the glass will remain in the tank for as long a period as in the dead corners of the ordinary furnaces referred to above, which will result in the elimination of devitrified glass. This is accomplished by constructing a continuous tank furnace wherein the melting, refining and cooling chambers together with the working receptacle or draw-pot are all of substantially the same width. It is furthermore proposed to prevent a too rapid cooling of the border portions of the glass within the refining and cooling zones by suitably insulating the refining and cooling chambers.

Other objects and advantages of the invention will become more apparent during the course of the following description when taken in connection with the accompanying drawings.

In the drawings forming a part of this application and wherein like numerals are employed to designate like parts throughout the same, Fig. 1 is a diagrammatic top plan view of the general tank construction.

Fig. 2 is a longitudinal vertical section therethrough, and

Fig. 3 is a similar view showing a slightly modified furnace construction.

Referring now to the drawings, the improved furnace is designated in its entirety by the numeral 5, the said furnace comprising a melting end or chamber 6, a refining end or chamber 7, a cooling chamber 8 and a preferably shallow working receptacle or draw-pot 9. As best shown in Fig. 1, the melting, refining and cooling chambers together with the draw-pot 9 are all of substantially the same width so that the furnace is practically devoid of any dead spaces or corners. The bottom of the cooling chamber 8 is inclined upwardly toward the draw-pot 9 to prevent any accumulation of stagnant glass at the juncture of the refining and cooling chambers. The chambers 6, 7 and 8 are portions of one long continuous tank, the differences being marked by the different temperature conditions maintained in the different tank sections.

The glass batch ingredients are adapted to be introduced into the melting chamber 6 through an open compartment or doghouse 10 at one end thereof and are melted to form the mass of molten glass 11. The molten glass is then adapted to continuously flow through the refining and cooling chambers 7 and 8 respectively into the draw-pot 9 from which it may be drawn upwardly in sheet form as indicated at 12, the width of the sheet being substantially the same as that of the draw-pot 9 and melting, refining and cooling chambers 6, 7 and 8 respectively.

The melting of the batch may be performed in any preferred or well known manner but as shown herein, by way of example, it is accomplished by gas flames issuing into the furnace from a plurality of suitable longitudinally spaced burners 13, the flames playing directly upon the surface of the molten glass as shown in Fig. 2. These burners may be positioned equi-distant the sides of the tank with the flames spreading out over the surface of the molten glass, thus thoroughly fusing the raw materials, since the width of the molten glass is relatively narrow as compared to the melting end of the ordinary furnace. Of course several rows of heating elements may be used if desired and the glass may be further conditioned by means of flames entering the furnace through ports 18.

In order to minimize radiation of the heat through the walls of the refining and cooling chambers, the said walls are covered with suitable insulation 14. Inasmuch as this insulation will prevent the heat of the border portions of the glass from escaping through the walls of the furnace, the temperature of said border portions will remain substantially the same as the temperature of the central flow of molten glass and since the temperature is the same, the flow of the molten glass through the refining and cooling chambers to the point of draw, will be substantially uniform throughout its entire width. With the present invention, the moving stream or body of molten glass flowing through the melting, refining and cooling zones into the working zone is always maintained at a constant width and substantially the same width as the sheet being drawn. Consequently, the molten glass as it is introduced into the sheet will not only have a substantially uniform flow movement but will also be of a substantially uniform temperature. In other words, the molten glass produced within the melting tank will flow uniformly through the furnace to supply both the border portions, and main body of the sheet, the molten glass maintaining this uniform rate of flow throughout its width from the melting tank to the point of draw. Any scum, etc. which might form upon the surface of the molten glass can be removed through the skimming opening 15 in a manner well known in the art.

In Fig. 3 there is arranged within the furnace at a point intermediate the melting and refining chambers 6 and 7 respectively, a stationary curtain or baffle wall 16 which depends downwardly into the molten glass 11. An adjustable gate or shear cake 17 is arranged above the curtain wall 16 in alignment therewith and is movable vertically towards and away therefrom. This arrangement is provided in order that the amount of heated atmosphere passing from the melting chamber into the refining and cooling chambers of the tank may be effectively controlled to the end that the desired temperature conditions in these latter chambers may be maintained. Upon raising the shear cake 17, it will be evident that a greater amount of the heated atmosphere within the melting zone will be permitted to pass into the refining and cooling zones and that when the shear cake 17 is lowered, the passage of this heated atmosphere will be reduced.

It is to be understood that the form of the invention herewith shown and described is to be taken as the preferred embodiment of the same, and that various changes in the shape, size and arrangement of parts may be resorted to without departing from the spirit of the invention or the scope of the subjoined claims.

Claims:

1. A continuous tank furnace including a melting chamber, a refining chamber, a cooling chamber, and a working receptacle, all of said chambers together with said working receptacle being of the same width throughout.

2. A continuous tank furnace including a melting chamber, a refining chamber adjoining and in direct communication with said melting chamber, a cooling chamber adjoining and in direct communication with said refining chamber, a working receptacle adjoining and in direct communication with said cooling chamber, all of said chambers together with said working receptacle containing molten glass and being of the same width throughout, and heating means within the melting chamber for directing a flame upon the surface of the molten glass therein.

3. A continuous tank furnace, including a melting chamber, a refining chamber, and a cooling chamber, all of said chambers being of the same width throughout and adapted to contain molten glass, and means for forming a sheet from the molten glass in the furnace of a width the same as the width of said furnace.

4. A continuous tank furnace, including a melting chamber, a refining chamber, a cooling chamber, and a working receptacle, all of said chambers together with the working receptacle being of the same width throughout and adapted to contain molten glass, and means for forming a sheet from the glass in the working receptacle of a width the same as the width of said furnace.

5. A continuous tank furnace, including a melting chamber, a refining chamber, and a cooling chamber, all of said chambers being of the same width throughout and adapted to contain molten glass, said cooling chamber having an outlet of a width equal to the width of the said chambers.

6. A continuous tank furnace, including a melting chamber, a refining chamber, a cooling chamber, and a working receptacle, all of said chambers together with said working receptacle being of the same width throughout and adapted to contain molten glass, said cooling chamber having an outlet communicating with the working receptacle and which is of a width equal to the width of said chambers.

Signed at Toledo, in the county of Lucas and State of Ohio, this 31st day of May, 1927.

JOHN L. DRAKE.